Figure 1:
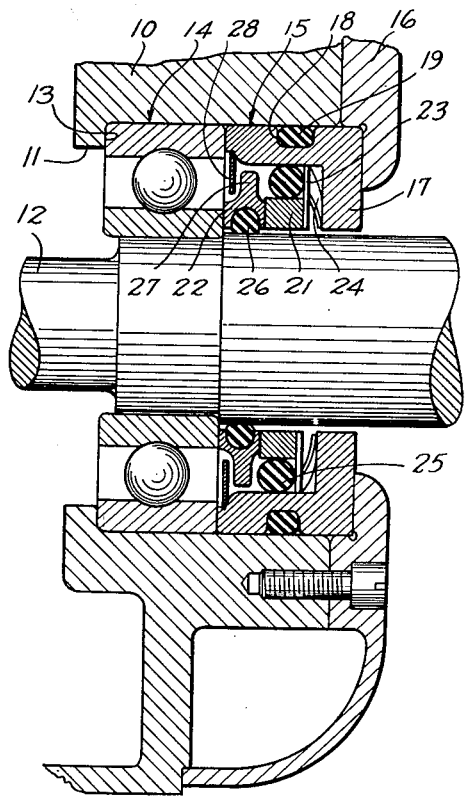
Figure 2:
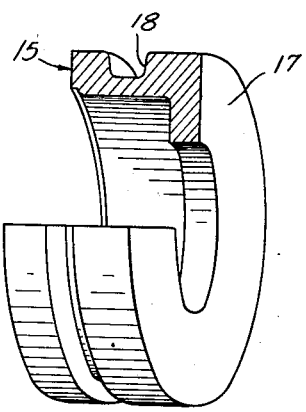
Figure 3:
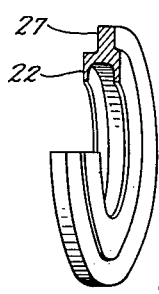
Figure 4:
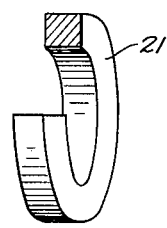
Figure 5:
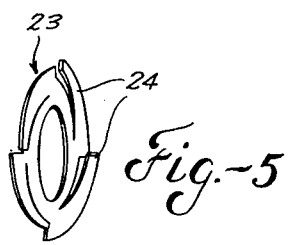

April 19, 1955 A. F. BERGER 2,706,652
OIL SEAL
Filed Sept. 14, 1949

Inventor
Arthur F. Berger

Tom Walker
Attorney

United States Patent Office 2,706,652
Patented Apr. 19, 1955

2,706,652

OIL SEAL

Arthur F. Berger, Dayton, Ohio, assignor to The Master Electric Company, Dayton, Ohio, a corporation of Ohio Application September 14, 1949, Serial No. 115,610

7 Claims. (Cl. 286—11.14)

This invention relates to lubricant seals for shaft bearings, and more particularly to a unitary assembly of sealing and mounting elements.

The invention contemplates a generally new multiple shoe type sealing unit having unitary interchangeability with conventional metal or rubber diaphragm seals. One practical embodiment of such unitary shaft bearing seal includes a cup-shaped mounting ring, two-part oil seal shoe means within the mounting ring comprising a steel shoe to engage the bearing and a graphite shoe sealing against the steel shoe, a spring acting on the shoe means, individual sealing and positioning means between the graphite shoe and the mounting ring and between the steel shoe and the shaft, and other elements cooperating with those noted in production of the instant improved sealing unit.

The object of the invention is to simplify the construction as well as the means and mode of operation of bearing seals as disclosed herein, whereby such seals may not only be economically manufactured, but will be more efficient and satisfactory in use, adaptable to wide variety of installations, having relatively few parts and be unlikely to get out of repair.

A further and important object of the invention is to provide a unitary assembly which may be inserted or withdrawn from a shaft as a single unit.

A further object of the invention is to provide a multiple shoe type seal in which the point of relative movement is distantly located relative to the bearing.

A further object of the invention is to provide a tortuous path through the seal to thereby reduce the chance of lubricant flow therethrough.

A further object of the invention is to provide in such a seal a centrifugal type slinger disc construction.

Another object of the invention is to simplify the construction and manner of making of the sealing unit, utilizing fewer, more easily manufactured parts.

A further object of the invention is to embody improved leak-proof characteristics in a seal of the kind described, such improvement being obtained in part by more extensive yet simplified sealing and by a reduction in the deteriorating effects of heat and friction.

Still another object of the invention is to enable the sealing unit to be made more easily in varying sizes.

A further object of the invention is to provide a seal possessing the advantageous structural features, the inherent meritorious characteristics and the mode of operation herein mentioned.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawings, or their equivalents.

Referring to the accompanying drawing, wherein is found the preferred but obviously not necessarily the only form of embodiment of the invention, Fig. 1 is a longitudinal sectional view of a shaft and bearing assembly, showing in conjunction therewith a sealing unit in accordance with the instant invention;

Figs. 2 to 5 are detail perspective views of the mounting ring, steel shoe, graphite shoe and spring, respectively, all forming part of the sealing unit.

Like parts are indicated by similar characters of reference throughout the several views.

Referring to the drawing, a housing of an electric motor for example, is indicated at 10 having therein an opening 11 to receive a shaft 12. A recess 13 surrounding opening 11 mounts a lubricated ball bearing unit 14 and, outside the bearing unit 14, a sealing unit 15 to prevent the escape of lubricant from the bearing. Shaft 12 is rotatably supported by the bearing 14 and extends through and beyond the sealing unit 15 which, like the bearing unit, is in surrounding relation to the shaft. The seal and bearing units are held in place in the recess 13 by a cap 16 or the like.

Considering the sealing unit 15 in detail, it comprises a cup-shaped mounting ring 17 arranged with its open end facing the bearing unit 14, the rim thereof abutting the outer or stationary ring of the bearing unit. In the external peripheral surface of such side wall is a circumferential groove 18 mounting a resilient ring seal 19 making sealing contact with the wall of recess 13.

Within the mounting ring and surrounded by the side wall thereof is a shoe assembly comprising a first ring shaped shoe 21 made of graphite or like material and a second ring shaped shoe 22 made of steel or the like. The shoes 21 and 22 are independent of one another and are arranged side by side in surrounding relation to the shaft 12. The steel shoe 22 occupies an outward position with respect to the shoe 21, being located between shoe 21 and bearing unit 14.

Interposed between the shoe 21 and the end wall of the mounting ring 17 is a ring 23 which backs up shoe 21. Projecting therefrom are resilient arms 24 pressing against the end wall of the mounting ring. The ring 23 accordingly functions as a spring, urging the shoe 21 into contact with the shoe 22 and urging the assembly comprising shoes 21 and 22 outward relatively to the mounting ring. In response to such action, the shoe 22 is pressed into engagement with the inner or rotating ring of the bearing unit 14.

The shoes 21 and 22 are spaced from the side wall of the mounting ring 17. A sealing ring 25 is mounted on the periphery of shoe 21 and makes sealing contact with the internal surface of the side wall of the mounting ring to prevent lubricant flow around the shoe 21 and at the same time to aid in holding the shoe concentric with respect to the shaft 12. A sealing ring 26 is mounted in a groove in the inner periphery of shoe 22 and makes sealing contact with the shaft 12 to hold shoe 22 concentric therewith and prevent seepage along the shaft.

The shoe 22 is further formed on its outer periphery with a projecting peripheral flange 27 extending toward the side wall of mounting ring 17 confining the seal 25 on the outward side thereof. Spring ring 23 is of greater diameter than shoe 21 and so confines the seal 25 on the inward side thereof. A retainer ring 28 is staked to the rim of the side wall of the mounting ring and extends inward in overlapping relation to the flange 27 on shoe 22. The seal elements of the unit 15 are thereby held by the ring 28 in position in the mounting ring permitting unitary assembling, handling and installation of the complete seal.

In the function and operation of the sealing unit 15 it is to be noted that since the steel shoe 22 is pressed against the inner ring of bearing 14 it tends to rotate with the shaft 12. Graphite shoe 21 is substantially stationary, and, by reason of its spaced position with respect to the bearing, is affected to a lesser degree by the heat of operation.

The escape of lubricant from the bearing along shaft 12 is prevented by seal 26. Lubricant flow around the exterior of mounting ring 17 is prevented by seal 19, while lubricant flow along the internal surface of the mounting ring is prevented by seal 25. The seal 25 likewise prevents flow around the shoe 21, while flow between the shoes 21 and 22 is prevented by the sealing contact therebetween established and maintained by spring 23. Flow around the shoe 22 to shoe 21 and seal 25 is not positively blocked, but it will be observed that the flange 27 and retainer ring 28 define a circuitous path of flow along this route imposing a substantial restriction to the flow of lubricant from the bearing to seal 25 and shoe 21.

Flange 27 further functions as a slinger ring, the lubricant which collects thereon being thrown from the periphery of the flange under influence of centrifugal force created by rotation of the shoe 22 and flange 27 in unison with the shaft 12. Thus, the greater part of the lubricant is trapped within the area intermediate the retainer ring 28 and flange 27.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect.

Having thus described my invention, I claim:

1. A unitary shaft bearing seal including a mounting ring formed with a lateral peripheral flange defining an open sided cup-like shape for said ring, a ring seal recessed in the outer surface of said flange, a graphite shoe surrounded by said flange, a ring seal interposed between the periphery of said graphite shoe and the internal surface of said flange, a metallic shoe arranged in parallel relation to said graphite shoe and in advance thereof to lie between the graphite shoe and the bearing, a ring seal recessed in the inner periphery of said metallic shoe and making a sealing contact with the shaft, a retaining ring secured to the flange on said mounting ring and extending inward into overlying relation to said metallic shoe, and spring means interposed between said mounting ring and said graphite shoe urging the assembly comprising said shoes and associated seals outward, said spring means providing a force for yielding pressural contact of said metallic shoe with the bearing.

2. A unitary bearing seal according to claim 1, characterized in that said spring means comprises a ring in flush engagement with said graphite shoe and projecting resilient fingers on said ring engaging said mounting ring.

3. A unitary shaft bearing seal, including a mounting ring formed with a lateral peripheral flange defining an open sided cup-like shape for said ring, a ring seal recessed in the outer surface of said flange, a graphite shoe surrounded by said flange, a ring seal interposed between the periphery of said graphite shoe and the internal surface of said flange, a metallic shoe arranged in parallel relation to said graphite shoe and in advance thereof to lie between the graphite shoe and the bearing, a ring seal recessed in the inner periphery of said metallic shoe and making a sealing contact with the shaft, an upright flange on the outer periphery of said metallic shoe, a retaining ring secured to the flange on said mounting ring and extending inward in overlapping relation to the flange on said metallic shoe, and spring means reacting against said mounting ring urging said graphite shoe into contact with said metallic shoe and urging the assembly comprising both said shoes outward relatively to the mounting ring, said spring means providing a force for yielding pressural contact of said metallic shoe with the bearing.

4. A unitary shaft bearing seal, including a mounting ring formed with a lateral peripheral flange, a graphite shoe surrounded by said flange, means effecting a sealing connection between the periphery of said graphite shoe and the internal surface of said flange, a metallic shoe arranged in parallel relation to said graphite shoe and in advance thereof to lie between the graphite shoe and the bearing, means in the inner periphery of said metallic shoe to make a sealing contact with the shaft, an upright flange on the outer periphery of said metallic shoe terminating short of contact with the flange on said mounting ring, a retainer secured to the flange on said mounting ring and extending inward in overlapping relation to the flange on said metallic shoe, said retainer ring and shoe flange cooperating to hold the elements of the seal in said mounting ring and further cooperating to define a circuitous lubricant escape route inhibiting such escape, said spring means reacting against said mounting ring and urging said graphite shoe outward, said spring means extending in relative projecting relation to the outer edge of said graphite shoe to lie in opposed parallel relation with the upright flange on said metallic shoe and to define with such upright flange side walls for the confining of said sealing connection between the periphery of said graphite shoe and the internal surface of the flange on said mounting ring.

5. A unitary shaft bearing seal, including a cup-shaped mounting ring, first and second independent shoes in said ring arranged in side by side contacting relation, the outer one of said shoes being positioned for contact with the bearing, spring means interposed between the end wall of said mounting ring and the inner one of said shoes to urge said inner shoe into contact with said outer shoe, and to effect pressure engagement of said outer shoe with the bearing, and respective sealing means mounted on the inner periphery of said outer shoe for sealing engagement with the shaft and on the outer periphery of said inner shoe for sealing engagement with the inner periphery of said mounting ring.

6. A unitary shaft bearing seal, including a cup-shaped mounting ring, two-part oil seal shoe means contained within but unconnected to the mounting ring and comprising a metallic shoe facing the open side of said ring for engagement with the bearing and a graphite shoe sealing against the metallic shoe and spaced thereby from the bearing, a spring acting on the shoes and reacting on said mounting ring, individual sealing and positioning means between the graphite shoe and the mounting ring and between the metallic shoe and the shaft, and a retaining ring installed in the open side of said ring for holding said two-part shoe means in said ring.

7. A unitary shaft bearing seal, including a cup-shaped mounting ring, oil seal shoe means loosely mounted in said mounting ring and spaced from the internal side wall thereof, a ring seal surrounding said shoe means and contacting the internal side wall of said mounting means, an external peripheral flange on said shoe means extending toward the internal side wall of the mounting ring and in confining relation to said ring seal on the outward side thereof, a ring seal internally recessed within said shoe means making sealing contact with the shaft and a spring in the form of a ring with projecting resilient arms, said spring being interposed between the end wall of the mounting ring and said shoe means and being of greater diameter than said shoe means so as to extend toward the internal side wall of the mounting ring in confining relation to said ring seal on the inward side thereof.

References Cited in the file of this patent

UNITED STATES PATENTS

| | | |
|---|---|---|
| 1,624,671 | Nelson | Apr. 12, 1927 |
| 2,037,144 | Olson | Apr. 14, 1936 |
| 2,185,554 | Janette | Jan. 2, 1940 |
| 2,342,955 | Meyer | Feb. 29, 1944 |
| 2,363,110 | Krug | Nov. 21, 1944 |
| 2,465,546 | Marslek | Mar. 29, 1949 |
| 2,467,960 | Brady | Apr. 19, 1949 |
| 2,498,739 | Magnesen | Feb. 28, 1950 |
| 2,505,189 | Krug | Apr. 25, 1950 |
| 2,531,079 | Payne | Nov. 21, 1950 |